Nov. 29, 1932.                    H. LANGE                    1,889,557
                                DELIVERY DEVICE
                              Filed April 25, 1931
Fig.1          Fig.2.          Fig.3.
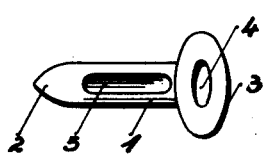   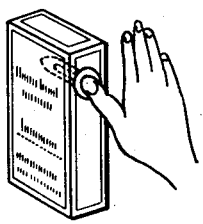   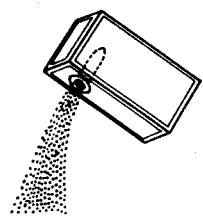
Fig.4.         Fig.5.          Fig.6.
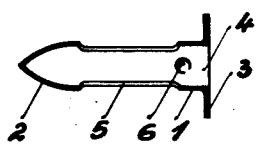   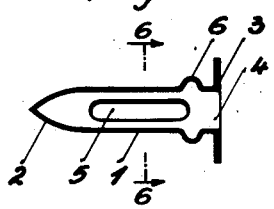   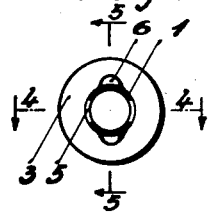
Fig.7.         Fig.8.          Fig.9.
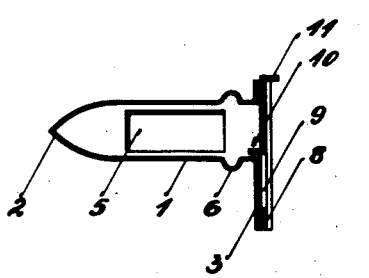   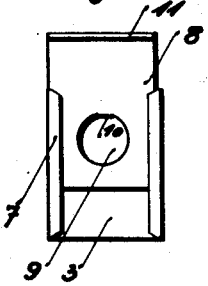   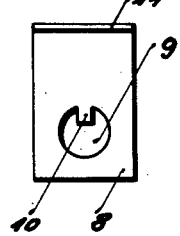
Fig.10.        Fig.11.         Fig.12.
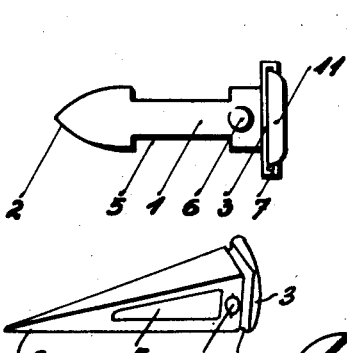  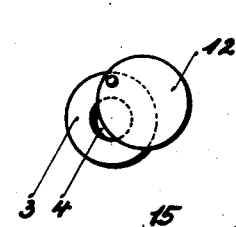  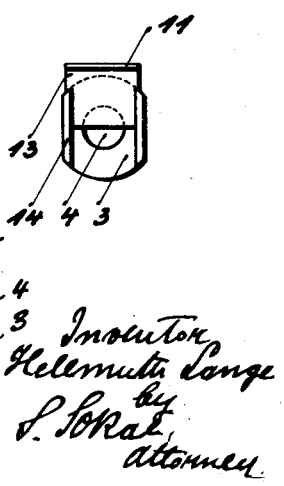
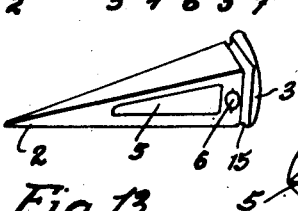  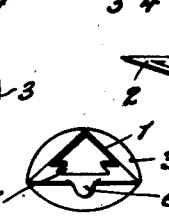
Fig.13.        Fig.15.         Fig.14.
Inventor
Hellmuth Lange
by S. Sokal
attorney Patented Nov. 29, 1932

1,889,557

UNITED STATES PATENT OFFICE

HELLMUTH LANGE, OF DUSSELDORF, GERMANY

DELIVERY DEVICE

Application filed April 25, 1931, Serial No. 532,868, and in Germany April 30, 1930.

I have filed applications in Germany on the 30th April, 1930 and on the 24th February, 1931.

The present invention relates to improvements in delivery devices for pouring out pulverulent, granular or like loose materials contained in packets, boxes and like containers made of cardboard. There are already known devices used also as closures for pouring out milk from tins, which are adapted to be driven into the lid of milk-containing tin and are so constructed as to provide a delivery opening for the milk and also at the same time an opening for the admission of air into the tin. These devices are suitable only for delivering or pouring out a liquid from a tin.

It has also been suggested in connection with packets containing pulverulent materials to provide the packet with a small opening fitted with a sieve which becomes accessible after the removal of a cover or lid and can be used for sprinkling or slowly pouring out or delivering the contents of the packet. Devices of this kind, which are permanently fixed to a packet or box have the disadvantage that they can, of course, be used only once and obviously increase the cost of the manufacture of the packet or box.

The object of the present invention is to provide a delivery device which may be easily fixed to practically any kind of package, box or like container made of thick paper or cardboard and containing pulverulent, granular or like loose materials. The improved delivery device, hereinafter shortly termed "spout", may therefore be used many times. The improved spout comprises a tubular main body which terminates at one end in a point and is provided at the other end with a surface, for instance a flange, which acts as a stop for limiting the inward movement of the device during insertion into the packet and serves also for holding the device in the packet. The tubular body is provided upon its periphery with one or more lateral openings and is open at the outer end, whilst the inner pointed end of the tubular body is preferably closed.

It will be understood that the device is inserted with its pointed end into a side of the box or packet until its flange or stopping surface comes into contact with the outer surface of the side. If the packet or box is now slightly inclined, the pulverulent or granular material contained therein will pour through the lateral opening or openings into the tubular member and then slowly through the outer opening at the front end of the spout. The invention therefore enables delivering loose materials from a packet without the necessity of tearing or destroying the packet. The invention also enables the operator to pour out the contents of the packet more slowly, which may be important in cases in which it is essential to dose the material. Should the packet or box fall, the improved device will limit or entirely stop the delivery of the material.

In the improved construction, means are provided for firmly holding the spout in the packet, for which purpose the tubular member may be provided with stops arranged at a very small distance behind the outer flange or stopping surface. These stops, whilst being so constructed as not to prevent the insertion of the spout into the packet, grip after the insertion of the spout the rear surface of the side of the box or packet through which the spout has been inserted and prevent accidental dropping out or removal of the spout during the pouring out of the contents. Instead of providing projections upon the tubular member which grip the rear surface of the side of the packet, a groove may be provided in the tubular member just behind the holding flange, this groove being so constructed as to enable the material of the side of the packet to spring into the groove. In an improved construction means are provided for closing the delivery opening so that the int ior of the box or packet may be entirely closed and access of air or moisture prevented. Preferably the closing means is mounted upon the stopping element or outer flange of the spout. The closing means may, for instance, consist of a slide member adapted to slide in lateral guides of the outer flange and provided with an opening adapted to be brought into coincidence with the outer opening of the spout. The slide may be provided with a tongue projecting into the opening of the slide and adapted to be bent inwards in which position the tongue serves for limiting the movement of the slide in both directions and for preventing accidental dropping out of the slide.

In another construction the closing means consist of a closing disc pivotally fixed to the outer flange or stopping element.

The accompanying drawing shows by way of example several constructions of the improved delivery device.

Fig. 1 shows in perspective view one construction of the improved spout,

Fig. 2 shows also in perspective view the manner in which the spout may be inserted into a cardboard box, Fig. 3 is a perspective view illustrating the pouring out of the contents of a box by the aid of the improved spout, Fig. 4 is a section on line 4—4 of Fig. 6, Fig. 5 is a section on line 5—5 of Fig. 6, Fig. 6 is a section on line 6—6 of Fig. 5, Figs. 4, 5 and 6 all correspond to Fig. 1.

Fig. 7 is a sectional elevation of a spout provided with a closing slide.

Fig. 8 is an end view corresponding to Fig. 7 showing the slide in the open position, whilst Fig. 9 is a detail front view of the closing slide.

Fig. 10 is a plan corresponding to Fig. 7.

Fig. 11 shows in front view a different construction of the closing means, the latter being in the form of a pivoted disc.

Fig. 12 shows a further construction of the closing means, the latter being in the form of a slide without an opening.

Figs. 13 to 15 show a further construction of the spout in which the tubular member is of triangular cross section, and is wedge shaped.

Fig. 13 is a perspective view of the spout, Fig. 14 is a sectional elevation and Fig. 15 is a section on line 15—15 of Fig. 14.

Referring first to the construction shown in Figs. 1 to 6, the spout comprises a tubular main body 1, which may be cylindrical or conical and may be of any suitable cross section. The main body 1 has a pointed inner end 2 for facilitating insertion into a container, and a stopping and holding surface, preferably a flange 3, having an opening 4 through which the interior of the tubular member 1 communicates with the atmosphere. The tubular member 1 has two lateral openings or slots 5. At a small distance behind the stopping and holding surface 3 the tubular member is provided with two or more projections 6 produced, for instance, by pressing or stamping, and so located as to co-operate with the outer flange 3 in gripping the material of the side of the packet through which the spout has been inserted.

In the construction shown in Figs. 7 and 8, the flange 3 is provided with lateral lugs 7 within which is adapted to slide a closing member 8 provided with an opening 9 adapted to register with the opening 4 of the spout, and with an upper lug 11 which serves for manipulation of the closing member. The closing member is separately shown in Fig. 9. It will be seen that the closing member is provided with a projection 10 projecting into the opening 9. This projection is, after insertion of the slide into the lugs 7, bent inwardly so that it projects into the opening 4 of the spout and serves as a tongue for limiting the movement of the slide in both directions.

Fig. 11 shows another construction of the closing means in which the latter consists of a closing disc 12 pivoted to the flange 3 and adapted to close the opening 4.

Fig. 12 shows a further and simplified construction of the closing member 13. In this construction the closing member 13 is again provided with a lug 11 for facilitating manipulation, but it is solid, that is to say, it is not provided with an opening. The closing slide 13 is guided in lateral lugs 14 of the flange 3.

Figs. 13, 14 and 15 show a construction in which the tubular member is triangular in cross section and is wedge-shaped, tapering inwardly to a fine point. This construction is particularly suitable for insertion into a corner of a packet or container. It shows in addition to a stop 6 a further means for gripping the side of the packet, namely a groove 15 adjacent to the flange 3. The material of the box or packet springs into this groove after the insertion of the spout.

I claim:

1. An internal spout adapted to be inserted into a container so as to lie entirely within the container comprising in combination: a tubular main body tapering inwardly and provided with exterior stopping means; said main body being provided with lateral openings and an outer delivery opening; and a closing slide slidably mounted upon the outer stopping surface and provided with an opening corresponding with the outer opening of the spout, said slide being also provided with an inwardly projecting tongue co-operating with the outer opening of the spout in limiting the movement of the slide in both directions.

2. A spout for delivering pulverulent and granular material, said spout being adapted to be inserted into a container so as to lie entirely within the container, comprising in combination: a main tubular body terminating at one end in a point for facilitating insertion and provided with lateral communication openings and an outer delivery opening; an external stopping member upon said main body and a groove behind said stopping member, substantially as and for the purpose described.

3. A delivery device for insertion into a paper or cardboard container for pulverulent or granular materials, consisting in a spout and comprising in combination: a tubular, laterally slotted main body having a delivery opening; a conical end member on said main body formed integrally therewith and terminating in a single point adapted to pierce the material of the container; a lateral flange formed integrally with said main body at the extremity of the other end thereof and resting tightly against the side of the container when the device is inserted therein, whereby said flange forms an outer stop; and inner stop members integral with said tubular member, located closely adjacent to said lateral flange and retaining the device within the container, substantially as described.

4. A delivery device for insertion into a paper or cardboard container for pulverulent or granular materials consisting in a spout and comprising in combination: a tubular, laterally slotted main body having a delivery opening; a conical end member on said main body formed integrally therewith and terminating in a single point adapted to pierce the material of the container; a lateral flange formed integrally with said main body at the extremity of the other end thereof and resting tightly against the side of the container when the device is inserted therein, whereby said flange forms an outer stop; and projections provided upon the tubular member, located closely adjacent to said lateral flange and retaining the device within the container, substantially as described.

5. A delivery device for insertion into a paper or cardboard container for pulverulent or granular materials, consisting in a spout and comprising in combination: a tubular, laterally slotted main body having a delivery opening; a conical end member on said main body formed integrally therewith and terminating in a single point adapted to pierce the material of the container; a lateral flange formed integrally with said main body at the extremity of the other end thereof and resting tightly against the side of the container when the device is inserted therein, whereby said flange forms an outer stop; projections provided upon the tubular member, located closely adjacent to said lateral flange and retaining the device within the container; and a groove immediately behind said lateral flange, substantially as described.

6. A delivery device for insertion into a paper or cardboard container for pulverulent or granular materials, consisting in a spout and comprising in combination: a tubular, laterally slotted main body having a delivery opening; a conical end member on said main body formed integrally therewith and terminating in a single point adapted to pierce the material of the container; a lateral flange formed integrally with said main body at the extremity of the other end thereof and resting tightly against the side of container when the device is inserted therein, whereby said flange forms an outer stop; inner stop members integral with said tubular member, located closely adjacent to said lateral flange and retaining the device within the container; and a closing slide slidably mounted upon said lateral flange and provided with a manipulating lug, substantially as described.

Signed at Cologne, Germany this 13th day of April, 1931.

HELLMUTH LANGE.